United States Patent [19]

Tysver et al.

[11] Patent Number: 5,098,343

[45] Date of Patent: Mar. 24, 1992

[54] RETRACTABLE SHAFT COUPLING

[75] Inventors: John D. Tysver; John M. Hahn, both of Rockford, Ill.

[73] Assignee: Sundstrand Corporation, Tulsa, Okla.

[21] Appl. No.: 453,585

[22] Filed: Dec. 20, 1989

[51] Int. Cl.⁵ .......................... F16D 1/00; F16D 3/06
[52] U.S. Cl. ...................... 464/169; 403/315; 403/359; 464/901
[58] Field of Search ............... 469/147, 153, 154, 158, 469/159, 169, 901; 403/315, 359

[56] References Cited

U.S. PATENT DOCUMENTS

| | | | |
|---|---|---|---|
| 1,362,652 | 12/1920 | Tucker | 464/158 |
| 1,631,236 | 6/1927 | Werner | 464/901 X |
| 2,914,929 | 12/1959 | Irons | 464/158 X |
| 4,270,367 | 6/1981 | Santore | 464/169 |
| 4,913,681 | 4/1990 | Green | 464/154 |

Primary Examiner—Daniel P. Stodola
Assistant Examiner—William G. Battista, Jr.
Attorney, Agent, or Firm—Wood, Phillips, Mason, Recktenwald & VanSanten

[57] ABSTRACT

Difficulty in disconnecting two coupled shafts (38, 40) is avoided through the use of a retractable shaft coupler which includes a sleeve (22) which can engage respective shafts (38, 40) at each of its ends and having at least one spring (28) coaxially positioned inside of the sleeve (22). The spring (28) is sandwiched and contained inside of the sleeve (22) by washers (24, 26) which are retained by splines (32, 34). The construct allows retraction from one of the shafts (40) by moving the tubular member (22) in the axial direction away from the shaft (40) against the bias of the spring 28.

13 Claims, 1 Drawing Sheet

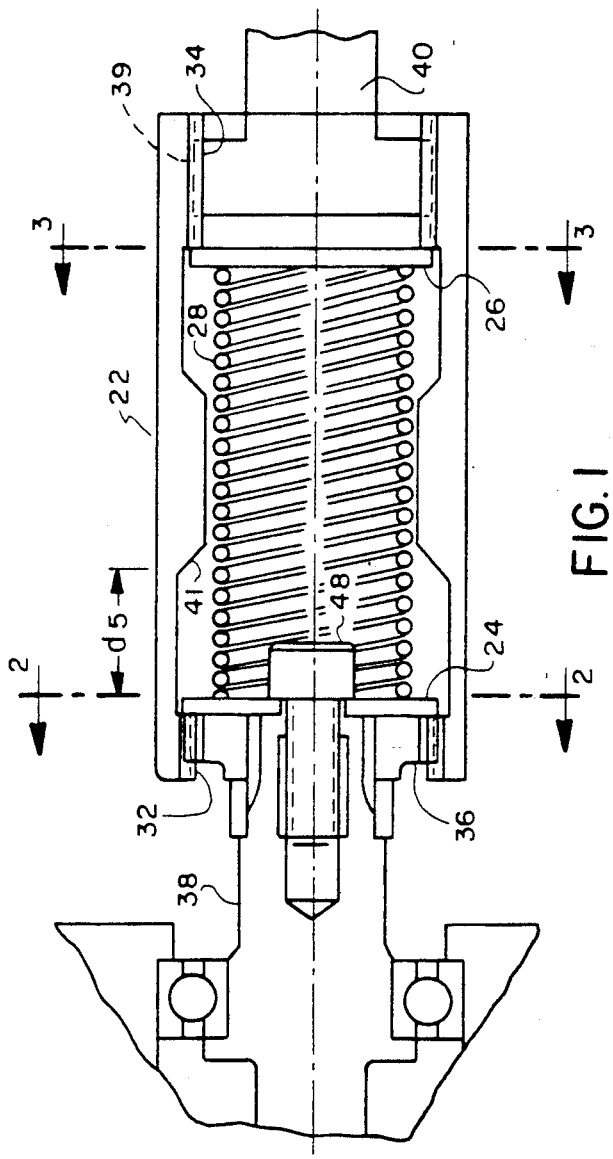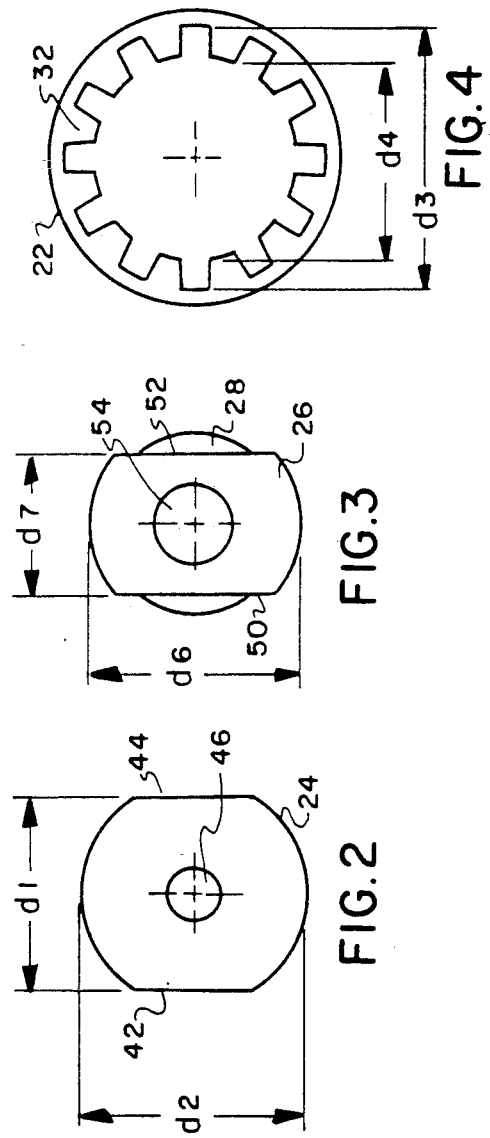

RETRACTABLE SHAFT COUPLING

FIELD OF THE INVENTION

The present invention generally relates to retractable shaft couplings for connecting a drive shaft and a driven shaft.

BACKGROUND OF THE INVENTION

When transferring power from a drive means, such as a motor or engine, to a driven means, such as a pump compressor or turbine, a rotatable shaft is often provided to connect the two. Furthermore, it is often advantageous to provide two separate shafts, one being a driving shaft and one being a driven shaft, to facilitate manufacture and repair. In using two shafts, a coupler is required. If the coupler is not relatively easy to retract or remove, repairing the system may be hindered.

Therefore, a simple, low cost, easy to retract or remove coupler would be of great benefit in situations in which two shafts need to be coupled. The present invention is directed to providing such a coupler and overcoming one or more of the above problems.

SUMMARY OF THE INVENTION

It is the principal object of this invention to provide a new and improved coupler for coupling two shafts. The coupler allows for easy installation without tools and without necessarily using fasteners, such as screws, bolts, etc. Further, the invention allows for the retraction of the coupler from at least one of the shafts by simply moving the coupler away from the shaft without the use of tools.

The principal object of the invention is achieved in a retractable coupler having a hollow tubular member which extends between two shafts and engages a respective shaft at each of its ends along with at least one spring coaxially positioned inside of the tubular member. The spring is sandwiched and contained inside of the tubular member by sandwiching and containing means which are slidable inside of the tubular member and are retained so that they cannot escape or fall out of the tubular member. This construction allows for retraction of one of the shafts by moving the tubular member in the axial direction away from the shaft against the bias of the spring.

In a preferred embodiment, the tubular member has internal splines at each end for engaging corresponding external splines of the shafts, and the spring will be sandwiched between two washers which are concentrically and slidably positioned in the tubular member. The washers are in axially slidable engagement with the shaft nearest them and the washers are retained in the tubular member by the internal splines. One or more of the washers includes a hole in the center for receipt of a bolt to connect the washer to its adjacent shaft.

In a most preferred embodiment, at least one of the washers has an outside diameter larger than the inside diameter of at least one of its corresponding internal spline and also has flatted edges such that the distance between the edges is less than the inside diameter of its corresponding internal spline so that the washer may be inserted endwise into the tubular member and then rotated to be retained by the spline. The tubular member includes a section having a reduced interior diameter in close adjacency to the spring for piloting and stabilizing the spring and the section is distanced from the end of the tubular member so that the washer can also be rotated 90° after endwise insertion so as to abut its corresponding internal spline.

An additional advantage provided by the coupler is that the Vernier indexing of spline teeth may be more easily accomplished upon retraction and subsequent engagement.

Other objects and advantages will become apparent from the following description and accompanying drawings.

DESCRIPTION OF THE DRAWINGS

FIG. 1 is a sectional view of the preferred embodiment of the invention;

FIGS. 2 and 3 are sectional views of the washers used in the preferred embodiment and taken respectively approximately along the lines 2—2 and 3—3 in FIG. 1; and FIG. 4 is an axial view through the hollow tubular member.

DESCRIPTION OF THE PREFERRED EMBODIMENT

Referring now to the drawings, and more particularly to FIG. 1, there is shown a retractable coupler made according to the invention and including a hollow tubular sleeve 22 having a first washer 24, a second washer 26, and a coil spring 28 disposed therein.

The sleeve 22 has internal, full circumferential splines 32,34 at both of its ends. The spline 32 is meshed with the external spline 36 of a drive shaft 38 while the internal spline 34 is adapted to correspond and engage with the external spline 39 of a driven shaft 40. Intermediate its ends, the sleeve 22 has an interior section with a reduced diameter 41 which pilots and stabilizes the spring 28. That is to say, the reduced diameter 41 is in close proximity to the outer diameter of the coil spring 28 and prevents the same from twisting or buckling when under load.

The first washer 24, as shown in FIG. 2, has a diameter d2 and also has flatted edges 42,44 which are spaced a distance d1 apart. The diameter d2 is greater than the inside diameter d4 and less than the outside diameter d3 of the internal spline 32, as shown in FIG. 4. Furthermore, the distance d1 is less than the internal diameter d4 of the inside spline 32, FIG. 4. This spacing allows for the endwise insertion of the washer 24 into the sleeve 22 before engagement with the drive shaft 38.

Once inserted, the washer 24 is rotated 90° and abuts the internal spline 32 which serves to retain the washer 24 in the sleeve 22. In this regard, the distance d5 between the washer 24 and the spring pilot 41 is such that after endwise insertion, the washer 24 may undergo rotation so as to be brought into abutment with the internal spline 32.

As shown in FIG. 2, the washer 24 also has a hole 46 therein to allow a bolt 48, shown in FIG. 1, to be inserted therethrough and to connect the washer 24 to the drive shaft 38.

The external spline 36 may have a crowned surface so as to allow misalignment of the splines.

The second washer 26 also has flatted edges 50,52 which are spaced at a certain distance so as to allow its endwise insertion into the tubular member 22. The washer 26 also has a diameter d6 which will allow it to abut the internal spline 34, typically equal to the diameter d2. The washer 26 has a hole 54 which will be of such a size as to allow the bolt 48 to pass through into the sleeve 22 and into position after placement of the coupler on the shafts. The distance d7 between the flatted edges of the washer 26 allows a tool to pass along the sides 50,52 to engage and compress the spring 28 when the washer 26 is being inserted to prevent interference between the two during the insertion process.

In an unretracted position as shown in FIG. 1, the spring 28 is compressed between the washers 24,26 and biases the washers 24,26 into their respective positions of abutment with the internal splines 32,34.

It can be seen that to retract the coupler away from the driven shaft 40, the sleeve 22 needs to be moved axially away from the driven shaft 40 such that the coupler splines 32 and 34 will disengage from the shaft 38 and 40. An extra advantage of this is that Vernier indexing of the spline teeth may be accomplished when conventional Vernier splines are used.

The retraction of the coupler from the driven shaft 40 requires no special tools and is quite easy and quick to accomplish. The driving or driven component, as a result, can easily be removed and replaced without hindrance from the coupling.

The invention provides a very simple, low cost maintenance coupler which can be used in many situations. The design allows for rapid retraction from the driven shaft so as to allow for more speedy repairs and/or replacement.

We claim:

1. A retractable coupler for connecting a driving shaft and a driven shaft comprising:
   a hollow tubular member having two ends, one end having first internal means for axially, slidably engaging said driving shaft, the other end having second internal means for axially, slidably engaging said driven shaft said tubular member further being capable of axial movement relative to said shafts;
   a first washer slidably positioned inside of said tubular member, said first washer being axially slidable and engageable with said driving shaft;
   a second washer slidably positioned inside said tubular member, said second washer being axially slidable and engageable with said driven shaft;
   at least one spring positioned in said tubular member and between said washers; and
   means for retaining said washers in said tubular member;
   whereby the coupler is adapted to be retracted from one of said shafts by moving the tubular member axially away from said one shaft.

2. The coupler as recited in claim 1 wherein said first internal means for axially engaging said driving shaft is an internal spline.

3. The coupler as recited in claim 1 further including means for stabilizing said spring disposed on the inside of said tubular member and positioned between said washers.

4. The coupler as recited in claim 1 wherein at least one of said washers has a hole in the center thereof for receipt of a bolt to connect said one washer to one of said shafts.

5. A retractable coupler for connecting a driving shaft and a driven shaft comprising:
   a hollow tubular member having two ends, one end having a first internal spline for slidably engaging a corresponding external spline of said driving shaft, the opposite end having a second internal spline for slidably engaging a corresponding external spline of said driven shaft so that said tubular member is capable of axial sliding movement relative to said shafts;
   a first washer concentrically and slidably positioned inside of said tubular member and in axially slidable engagement with said driving shaft;
   a second washer concentrically and slidably positioned inside said tubular member and in axially slidable engagement with said driven shaft;
   said washers being retained in said tubular member by said internal splines; and
   at least one coil spring positioned within said tubular member and compressed between said washers;
   whereby the coupler is adapted to be retracted from one of said shafts by sliding the tubular member axially away from said one shaft.

6. The coupler as recited in claim 5 further including means for stabilizing said spring disposed on the inner surface of said tubular member and between said washers.

7. The coupler as recited in claim 6 wherein the stabilizing means is a reduced interior diameter section of said tubular member and in close adjacency to said coil spring to pilot said coil spring therein.

8. The coupler as recited in claim 5 wherein at least one of said washers has a hole in the center thereof for receipt of a bolt to connect said one washer to one of said shafts.

9. The coupler as recited in claim 5 wherein at least one of said internal splines of said hollow tubular member is Vernier spline 10. The coupler as recited in claim 5 wherein said external spline of at least one of said shafts is crowned.

11. The coupler as recited in claim 5 wherein at least one of said washers has an outside diameter larger than the inside diameter of at least one of said internal splines.

12. The coupler as recited in claim 11 wherein said one washer has flatted edges, said edges spaced a distance apart which is less than the inside diameter of said one internal spline so as to allow endwise insertion of said one washer into said tubular member.

13. The coupler as recited in claim 12 wherein said tubular member further includes a section having a reduced interior diameter in close adjacency to said coil spring to pilot said coil spring therein, said section spaced a sufficient distance from at least one end of said tubular member so as to allow said one washer to be rotated 90° after endwise insertion so as to abut said one internal spline.

* * * * *